US010532762B2

(12) United States Patent
Sulser et al.

(10) Patent No.: US 10,532,762 B2
(45) Date of Patent: Jan. 14, 2020

(54) ENERGY-ABSORBING STEERING COLUMN

(71) Applicants: THYSSENKRUPP PRESTA AG, Eschen (LI); thyssenkrupp AG, Essen (DE)

(72) Inventors: Hansjörg Sulser, Gamprin (LI); Alexander Weselý, Feldkirch (AT); Wolfgang Xander, Feldkirch (AT); Markus Bialek, Buchs (CH)

(73) Assignees: THYSSENKRUPP PRESTA AG, Eschen (LI); THYSSENKURPP AG, Essen (DE)

( * ) Notice: Subject to any disclaimer, the term of this patent is extended or adjusted under 35 U.S.C. 154(b) by 153 days.

(21) Appl. No.: 15/760,326

(22) PCT Filed: Aug. 31, 2016

(86) PCT No.: PCT/EP2016/070437
§ 371 (c)(1),
(2) Date: Mar. 15, 2018

(87) PCT Pub. No.: WO2017/045916
PCT Pub. Date: Mar. 23, 2017

(65) Prior Publication Data
US 2018/0265116 A1 Sep. 20, 2018

(30) Foreign Application Priority Data
Sep. 16, 2015 (DE) .................. 10 2015 217 761

(51) Int. Cl.
B62D 1/19 (2006.01)
B62D 1/184 (2006.01)
(Continued)

(52) U.S. Cl.
CPC ............. *B62D 1/195* (2013.01); *B62D 1/184* (2013.01); *B62D 1/185* (2013.01); *B62D 1/189* (2013.01)

(58) Field of Classification Search
CPC ........ B62D 1/195; B62D 1/185; B62D 1/189; B62D 1/184
See application file for complete search history.

(56) References Cited

U.S. PATENT DOCUMENTS 7,188,867 B2 * 3/2007 Gatti ...................... B62D 1/195
280/777
9,834,246 B1 * 12/2017 Woycik .................... F16F 7/12
(Continued)

FOREIGN PATENT DOCUMENTS

CN 1539692 A 10/2004
CN 101274638 A 10/2008
(Continued)

OTHER PUBLICATIONS

English Translation of International Search Report issued in PCT/EP2016/070437, dated Nov. 7, 2016 (mailed Nov. 18, 2016).

*Primary Examiner* — Drew J Brown
(74) *Attorney, Agent, or Firm* — thyssenkrupp North America, Inc.

(57) ABSTRACT

A steering column for a motor vehicle may include a steering column tube in which a steering spindle is mounted rotatably about a longitudinal axis. The steering column tube is fastened to a carrier connected to a vehicle chassis so that in normal operation the steering column tube is retained non-displaceably on the carrier, but is displaceable along the longitudinal axis in a crash event where a force that acts on the steering spindle exceeds a threshold value. An energy-absorption device may comprise a bending element that is connected to the carrier and the steering column tube and may be deformed in a crash event as a result of the
(Continued)

longitudinal displacement of the steering column tube, thereby absorbing part of the energy of the steering column tube. The bending element may be at least partially surrounded by an insertion body, which prevents the binding element from contacting adjacent structural elements and deforms together with the bending element in a crash event.

18 Claims, 3 Drawing Sheets

(51) Int. Cl.
    *B62D 1/185*     (2006.01)
    *B62D 1/189*     (2006.01)

(56) References Cited

U.S. PATENT DOCUMENTS

| | | | |
|---|---|---|---|
| 9,896,120 B2* | 2/2018 | Appleyard | B62D 1/192 |
| 2007/0194563 A1* | 8/2007 | Menjak | B62D 1/195 |
| | | | 280/777 |
| 2007/0228716 A1* | 10/2007 | Menjak | B62D 1/192 |
| | | | 280/777 |
| 2008/0238071 A1 | 10/2008 | Oh | |
| 2008/0290641 A1 | 11/2008 | Galehr et al. | |
| 2009/0033082 A1* | 2/2009 | Klukowski | B62D 1/195 |
| | | | 280/777 |
| 2010/0018340 A1 | 1/2010 | Schnitzer et al. | |
| 2010/0186535 A1 | 7/2010 | Scapozza | |
| 2010/0307280 A1 | 12/2010 | Schnitzer | |
| 2011/0210536 A1 | 9/2011 | Monteil | |
| 2013/0054094 A1 | 2/2013 | Elsensohn et al. | |
| 2014/0020502 A1 | 1/2014 | Schnitzer | |
| 2014/0150594 A1 | 6/2014 | Riefe | |
| 2015/0128752 A1* | 5/2015 | Buzzard | F16F 7/128 |
| | | | 74/493 |
| 2016/0244015 A1* | 8/2016 | Dubay | B60R 21/02 |
| 2016/0368524 A1* | 12/2016 | Tinnin | B62D 1/192 |
| 2018/0050719 A1* | 2/2018 | Agbor | B62D 1/184 |
| 2019/0100230 A1* | 4/2019 | Messing | F16F 7/123 |

FOREIGN PATENT DOCUMENTS

| | | |
|---|---|---|
| CN | 102099238 A | 6/2011 |
| DE | 102009059159 B | 1/2011 |
| DE | 102013104958 B | 7/2014 |
| DE | 102014016510 A | 2/2015 |
| DE | 102014104354 B | 4/2015 |
| DE | 102014108577 B | 9/2015 |

* cited by examiner

ENERGY-ABSORBING STEERING COLUMN

CROSS REFERENCE TO RELATED APPLICATIONS

This application is a U.S. National Stage Entry of International Patent Application Serial Number PCT/EP2016/070437, filed Aug. 31, 2016, which claims priority to German Patent Application No. DE 10 2015 217 761.0, filed Sep. 16, 2015, the entire contents of both of which are incorporated herein by reference.

FIELD

The present disclosure generally relates to steering columns, including energy-absorbing steering columns for motor vehicles.

BACKGROUND

A steering column with an energy absorber for the case of a crash is known from German Patent Publication No. DE 10 2009 059 159 B3. This steering column comprises a bending wire which is unwound by the introduced impact energy. This known steering column has the disadvantage that, during unwinding of the bending wire, jamming occurs between the bending wire and the sheet profile in which the bending wire is arranged. As a result, the crash properties such as the level of force and consistency are negatively influenced over the life span.

Thus a need exists for an improved steering column in which the tendency of the bending wire to jam with the adjacent components is reduced.

DETAILED DESCRIPTION

Figure 1:
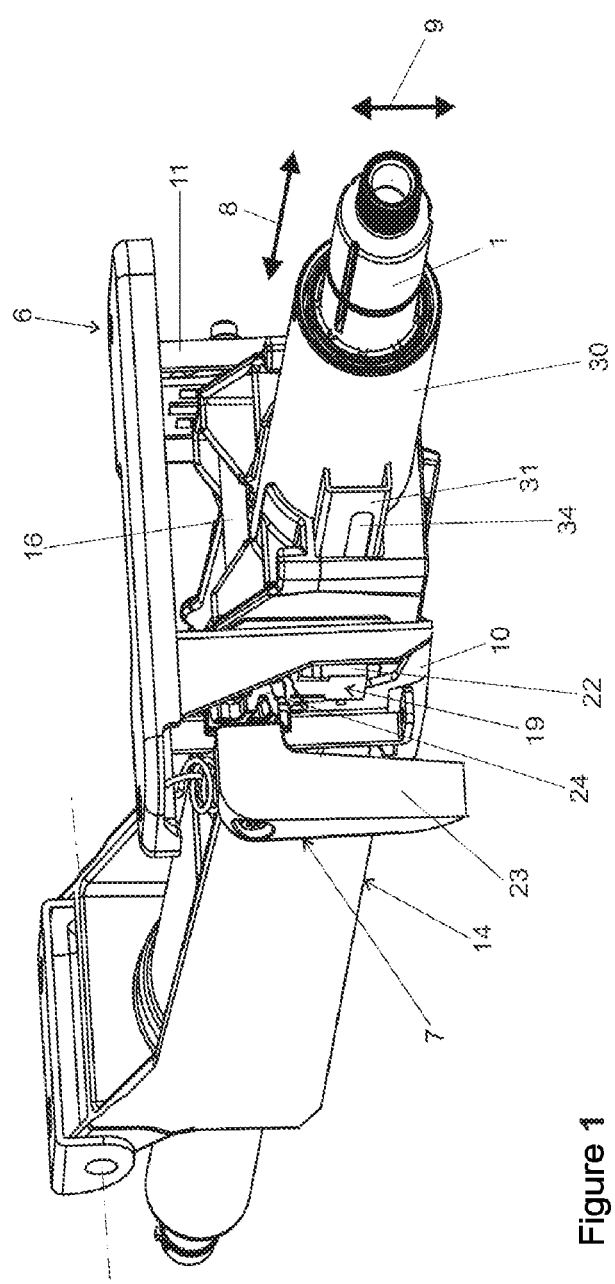
FIG. 1 is a perspective view of an example adjustable steering column for motor vehicles with an example energy-absorption device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In some examples, a steering column may include a steering column tube in which a steering spindle is mounted rotatably about its longitudinal axis. The steering column tube may be fastened to a carrier that is fixedly connected to a vehicle chassis so that, in normal operation of the motor vehicle, the steering column tube is retained non-displaceably on the carrier by means of friction forces and/or elastic forces. The steering column may be displaceable in a direction of the longitudinal axis in a crash event where a force acting on the steering spindle in a direction of the front of the vehicle exceeds a threshold value. The steering column may also include an energy-absorption device that comprises a bending element that is connected on one hand to the carrier and on the other hand to the steering column tube and that is deformed in a crash event as a result of a longitudinal displacement of the steering column tube. In such a scenario, the energy-absorption device absorbs part of a movement energy of the steering column tube.

In some examples, the bending element is surrounded on its outer surfaces which come into contact with adjacent structural elements with an insertion body which deforms together with the bending element in the event of a crash. The insertion body prevents direct contact between the bending element and adjacent structural elements so that the bending element can advantageously not jam on adjacent structural elements.

In one preferred embodiment, the bending element is configured as a bending wire which is bent in a U-shape and comprises a short limb, which is oriented substantially parallel to the longitudinal axis, with a bent end or an end provided with an eye and a long limb, which is oriented substantially parallel to the longitudinal axis, wherein, in the event of a crash, the short limb is lengthened and the long limb is shortened by deforming the bending wire, and that the insertion body comprises a short portion, which covers a part of the short limb, comprises a central portion bent in a U-shape and a long portion which engages from the outside around that portion of the long limb of the bending wire which is intended for deformation. The insertion body thus engages around or encloses all the portions of the bending wire which are deformed in the event of a crash in order to thus prevent a jamming of these portions of the bending wire. The term engaging around is to be understood as at least partially enclosing. The insertion body is simultaneously configured so that it enclosed or engages around the limbs and the U-shaped central portion of the bending wire so that the insertion body cannot slip to the side or even fall out. The term "substantially parallel to the longitudinal axis" refers to a solid angle to the longitudinal axis with a value less than or equal to ±10°.

In one preferred configuration, the insertion body is provided on its bent central portion with lugs laterally opposite one another in pairs which are formed in one piece with the insertion body and are bent inwards in order to laterally enclose or engage around the bending element. The lugs thus secure the correct position of the insertion body on the bending element. They can furthermore be produced in a simple manner by punching and bending from a single piece of material.

In one further development of the present disclosure, the insertion body is provided at its upper end region of the long portion with two opposite lugs which are formed in one piece with the insertion body and are bent inwards in order to laterally enclose or engage around the bending element. These lugs in the end region of the long portion can be further extended in the longitudinal direction than the lugs in the bending region. They also serve to secure the correct position of the insertion body on the bending element. They can also be produced like the smaller lugs by punching out and bending so that the insertion body can be formed from a single piece of material.

Just as in the upper end region, lugs can also be provided in the lower end region of the short portion of the insertion body, if the installation conditions allow this. If the installation conditions are in conflict with this, the end region of the short portion of the insertion body can of course also be configured without lugs.

In one modified embodiment of the insertion body, the long portion of the insertion body is provided with further lugs which laterally enclose that region of the long limb of the bending wire which is provided for deformation. This region is configured to be straight prior to a vehicle crash, but is deformed in the course of the bending of the bending body during the vehicle crash and thereby reaches the region of the bending element bent in a U-shape, wherein the insertion body is correspondingly deformed in a U-shaped manner. In this state, the stated further lugs are expedient for fixing the correct position of the insertion body.

In one preferred embodiment, the insertion body is configured from sheet metal or from spring steel sheet. This material can be procured at low cost and easily processed with simple means.

The insertion body is preferably formed in one piece by a punching/bending process and is therefore configured in one piece. This method is particularly suitable for metal sheets or spring steel sheet, but can also be used with other materials under certain circumstances.

The insertion body composed of sheet metal or spring steel sheet preferably has a greater hardness than the bending element. This leads to a further reduction in the tendency towards jamming.

In one configuration variant of the invention, it is provided that the insertion body is composed of plastic or a laminated fabric. Under certain circumstances, these materials are of even lower cost than sheet metal and can satisfy the requirements of the present invention.

In one further development of the invention, the insertion body can be provided at least partially with a coating which can further reduce the jamming of the bending element with components lying against it. For example, an anti-friction coating or a solid lubricant layer, such as, for example, molybdenum disulphide or graphite, can serve as the coating. A coating with polytetrafluoroethylene is also conceivable and possible.

Figure 4:
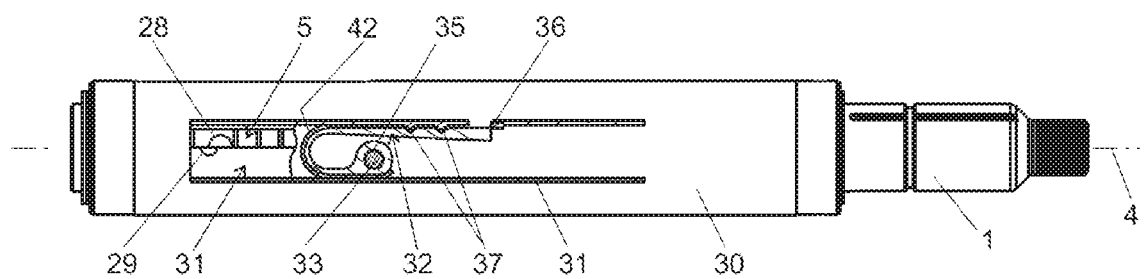
FIG. 4 is a lateral sectional view of an example steering column tube with an energy-absorption device prior to installation in a steering column with an example bending body in original form.

There is represented in FIG. 1 an example steering column for motor vehicles that has a steering column tube 30 in which a steering spindle 1 is rotatably mounted about its longitudinal axis 4 (see FIG. 4). Steering column tube 30 is fastened to carrier 6 which is fixedly connected to the vehicle chassis, not shown, wherein it is arranged so as to be adjustable upwards or downwards by means of an adjustment device in arrow direction 9. Moreover, a longitudinal adjustment in arrow direction 8 is provided. For adjustment in arrow direction 8 or in arrow direction 9, a fixing device 7 is released by means of a clamping lever 23, adjusts the steering column as desired in the framework of a defined adjustment region and subsequently once again fixes and locks the adjustment possibilities with fixing device 7 so that no adjustment movement in arrow direction 8 or arrow direction 9 is possible any more.

Carrier 6 is provided with two clamping jaws 10, 11 which project downwards and between which steering column tube 30 is arranged and can be clamped in the case of closed fixing device 7. Fixing device 7 is, for this purpose, fitted with a clamping bolt 16 which connects both clamping jaws 10, 11 to one another. A cam disc 24 is arranged on the side of clamping jaw 10, which cam disc 24 is connected to clamping lever 23 so that, in the event of an actuation of clamping lever 23, cam disc 24 is rotated and a fixing part 19 acting together with cam disc 24 is pushed transverse to longitudinal direction 4 in the direction of steering column tube 30. Fixing part 19 penetrates through an opening of clamping jaw 10 and presses against a portion 22 which engages with a toothing, not shown, into toothing 26 of a retaining part 5 which is clearly apparent in FIGS. 2, 3 and 6. Retaining part 5 is connected by means of its toothing 26 non-movably to carrier 6 via the clamping engagement of fixing device 7 as long as the fixing device is not released.

Figure 2:
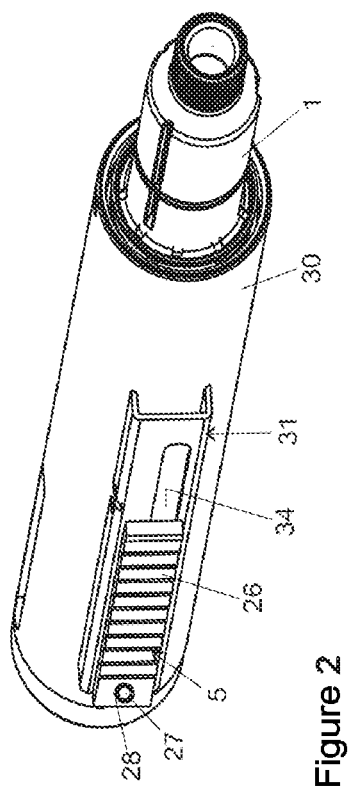
FIG. 2 is a perspective view of an example steering column tube of a steering column with an example energy-absorption device.
Figure 3:
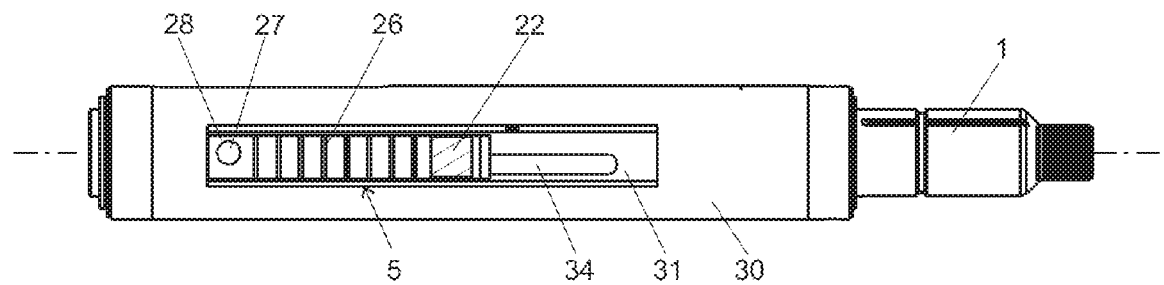
FIG. 3 is a side view of an example steering column tube of a steering column with an example energy-absorption device.
Figure 5:
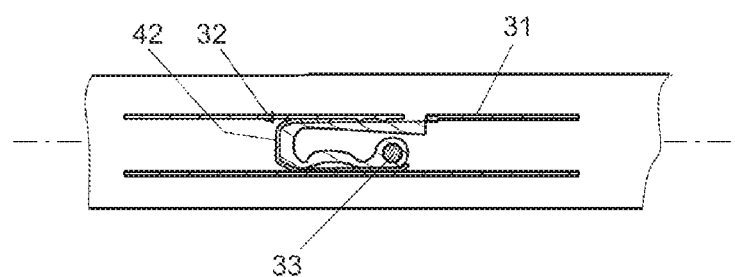
FIG. 5 is a partial view with respect to FIG. 4 of an example bending body that is deformed following a crash event.
Figure 6:
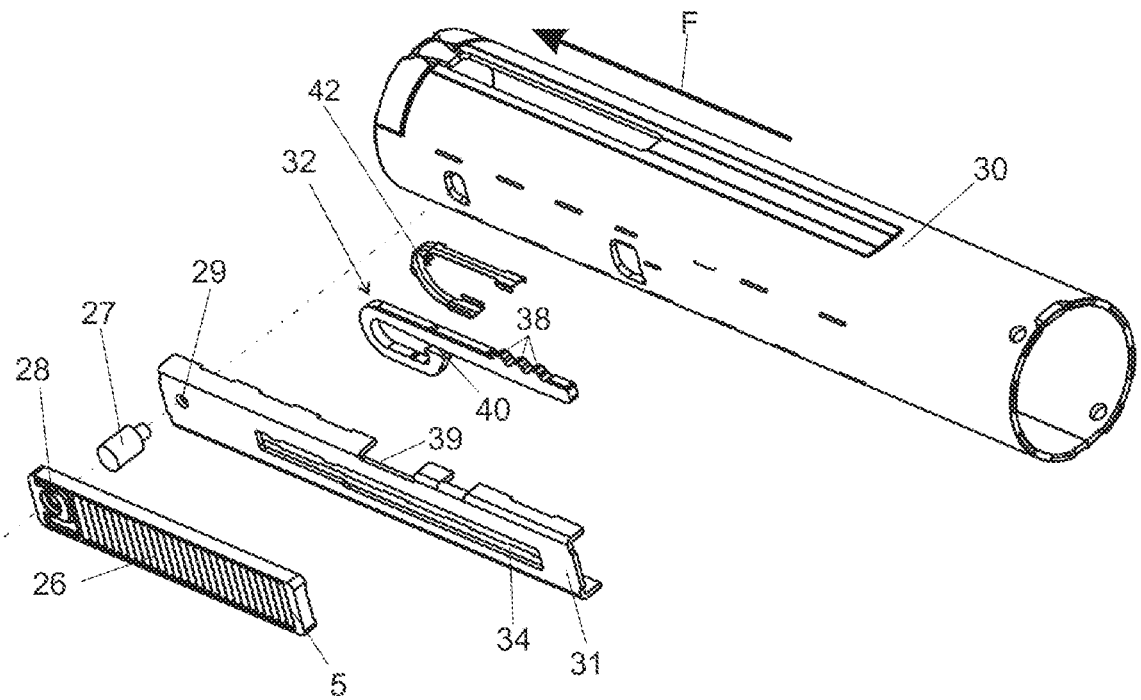
FIG. 6 is an exploded view of an example steering column tube with an example energy-absorption device.
Figure 7:
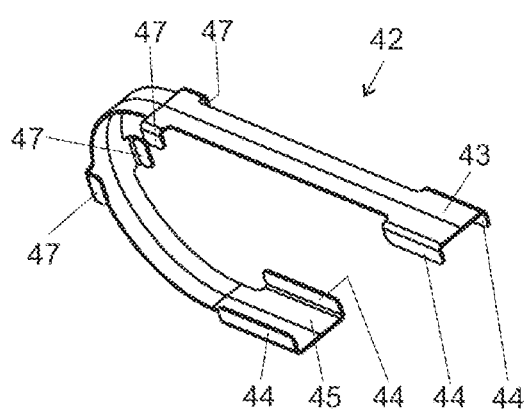
FIG. 7 is a perspective view of an example insertion body.
Figure 8:
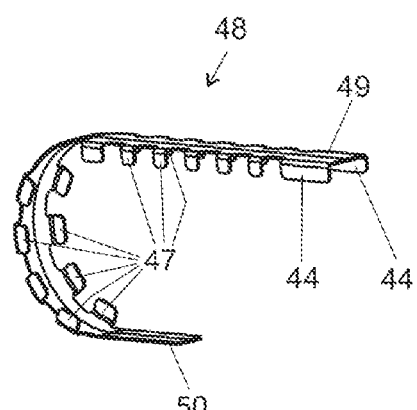
FIG. 8 is a perspective view of another example insertion body.

As can best be seen in FIGS. 2 and 6, steering column tube 30 is connected fixedly to a rail 31 which comprises side walls which are bent in a U-shape and which are fixedly welded to steering column tube 30. As a result, a strip-shaped cavity is created between rail 31 and steering column tube 30 in which a bending wire 32 is arranged. The rail is provided in its central portion with a slot 34 which runs longitudinally over the majority of rail 31 and through which a pin 33 (see FIGS. 4 and 5) of retaining part 5 engages into an eye 35 of bending wire 32. The eye 35 is arranged on a short limb of bending wire 32, which limb forms a transition via a region bent in a U-shape, i.e. across a bent-back region, into a long limb. Both limbs are oriented parallel to longitudinal direction 4. The long limb is latched in via a stop 36 and extensions 37 of the upper side part of rail 31 and thus connected to rail 31 in a positive-locking manner. Projections 38 of bending element 32 engage in recess 39 of the side part of rail 31. The end 40 of bending part 32 can also, as shown in FIG. 6, be bent over instead of forming a closed eye 35. If retaining part 5 is pushed by means of fixing device 7 against rail 31 welded on steering column tube 30, the frictional engagement between retaining part 5 and rail 31 thus already prevents unintended displacement of steering column tube 30 during normal operation of the motor vehicle. Moreover, a displacement in longitudinal direction 4 is prevented by engagement of pin 33 of retaining part 5 in eye 35 or bent over end 40 of bending element 32 since bending element 32 engages in a positive-locking manner via projections 38 into recess 39 of the side part of rail 31 which is fixedly welded to steering column tube 30 and is therefore not displaceable in longitudinal direction 4.

Moreover, a securing bolt 27 can additionally be provided which passes on one hand through an opening 28 in retaining part 5 and on the other hand is pushed into an opening 39 of rail 31. Securing bolt 27 forms, together with openings 28, 29, a breakaway connection which ensures that a defined breakaway force must act in longitudinal direction 4 on steering spindle 1 of the steering column before the narrow end of securing bolt 27, which engages into small opening 29 of rail 31, breaks out of opening 29 and thus enables further movement of rail 31 together with steering column tube 30 in the direction of force F acting towards the front of the vehicle. In the case of the subsequent movement in the direction of force F in longitudinal direction 4 of steering spindle 1, steering column tube 30 moves together with rail 31, wherein the pin fastened to retaining part 5 remains stationary since retaining part 5 is immovable with respective to the vehicle chassis via toothing 26 with clamping jaw 10 of carrier 6 fastened to the vehicle chassis. End 40 or eye 35 of bending element 23 is thus kept stationary, while the upper longer limb is pushed by rail 31 together with the steering column tube in the direction of acting force F. A part of the long limb of bending element 32 is bent over and reaches the U-shaped region which connects both limbs. This situation is apparent in FIG. 5.

As a result of the bending force to be applied, part of the kinetic energy of rail 31 and of steering column tube 33 and of the parts connected to the steering column tube such as the steering spindle and possibly the driver of the vehicle pushing on the steering spindle is absorbed in bending element and converted into heat and transformed into deformation energy. A braking action on the movement in longitudinal direction 4 towards the front of the vehicle is produced here.

Sticking or jamming can occur between the outer faces of bending element 32 and the inner faces of rail 31 so that the force required for the deformation of bending element 32 is modified by the force required to break jammed bending element 32 away from rail 31. As a result, the energy absorption for each unit of distance and thus the braking action of the energy-absorption device is no longer in the desired range.

In order to prevent jamming of bending element 32, an insertion body 42 is provided which encloses or engages around the larger faces of the bending element and thus prevents contact of the outer faces of the bending element with its adjacent structural elements, here in particular rail 31 and steering column tube 30. Bending element 32 is composed of a bending wire which is enclosed by insertion body 42, 48. The insertion body is composed of a shaped sheet metal part, preferably spring steel, which takes on the form, bent in a U-shape, of the bending element and comprises a slightly longer upper portion and a slightly shorter lower portion which are connected to one another via central portion 46 bent in a U-shape. The short portion of the insertion body covers part of the short limb of bending element 32. Bent central portion 46 of the insertion body covers the U-shaped region of bending element 32. The long portion of insertion body 42, 48 covers the long limb of bending element 32. Central portion 46 of insertion body 42, 48 is provided with lugs 47 laterally opposite one another in pairs which are formed in one piece with insertion body 42, 48 and are bent inwards in order to laterally enclose bending element 32. Moreover, two opposite longer lugs 44 are provided in upper end region 43, 49 of insertion body 42, 48 and are also formed in one piece with insertion body 42, 48 and are bent inwards in order to laterally enclose bending element 32.

In one modified embodiment, lower end region 45 of the short portion of insertion body 42 is also provided with longer lugs 44 as in the case of upper end region 43.

Another embodiment provides that the long portion of insertion body 48 is provided with further lugs which laterally encompass that region of the long limb of bending element 32 which is intended for deformation.

Present insertion body 33, 48 is punched and bent from spring steel sheet so that it is configured in one piece with all its parts, in particular lugs 44, 47. This is performed by a known punching/bending process.

Lower end region 50 of the alternative embodiment of insertion body 48 can also be configured without lugs.

Insertion body 42, 48 can furthermore be provided at least partially with a coating in order to prevent jamming of the insertion body on bending element 32 or on the surrounding components, in particular rail 31 and steering column tube 30.

LIST OF REFERENCE NUMBERS

1 Steering spindle
4 Longitudinal axis
5 Retaining part
6 Carrier
7 Fixing device
8 Arrow direction
9 Arrow direction
10 Clamping jaws
11 Clamping jaws
16 Clamping bolt
19 Fixing part
22 Portion
23 Clamping lever
24 Cam disc
26 Toothing
27 Securing bolt
28 Opening
29 Opening
30 Steering column tube
31 Rail
32 Bending element/Bending wire
33 Pin
34 Slot
35 Eye
36 Stop
37 Extension
38 Projection
39 Recess
40 End
42 Insertion body
43 Upper end region
44 Lugs
45 Lower end region
46 Bent central portion
47 Lugs
48 Modified insertion body
49 Upper end region
50 Lower end region
F Force

What is claimed is:

1. A steering column for a motor vehicle, the steering column comprising:
   a steering column tube in which a steering spindle is mounted rotatably about a longitudinal axis, the steering column tube being fastened to a carrier that is connected to a vehicle chassis such that in normal operation of the motor vehicle the steering column tube is retained non-displaceably on the carrier by at least one of friction forces or elastic forces, wherein the steering column tube is displaceable in a direction of the longitudinal axis in a crash event where a force that acts on the steering spindle in a direction of a front of the motor vehicle exceeds a threshold value;
   an energy-absorption device that comprises a bending element that is connected to the carrier and to the steering column tube, wherein the energy-absorption device is deformed in a crash event as a result of the longitudinal displacement of the steering column tube and thereby absorbs at least part of a kinetic energy of the steering column tube; and an insertion body that surrounds outer surfaces of the bending element and prevents the bending element from directly contacting adjacent structural elements, wherein in a crash event the insertion body deforms together with the bending element, wherein the bending element is a bending wire that is bent in a U-shape and comprises:
a shorter limb that is oriented substantially parallel to the longitudinal axis;
a bent end or an end with an eye; and
a longer limb that is oriented substantially parallel to the longitudinal axis, wherein in a crash event the shorter limb is lengthened and the longer limb is shortened by deformation of the bending wire, wherein the insertion body comprises:
a shorter portion that covers part of the shorter limb;
a central portion bent in a U-shape; and
a longer portion that engages from an outside around a portion of the longer limb that is configured to be deformed; and comprising lugs disposed on the central portion of the insertion body, wherein the lugs are disposed laterally opposite one another in pairs that are integral with the insertion body and are bent inwards to laterally engage around the bending element.

2. The steering column of claim 1 comprising two opposing lugs disposed at an upper end region of the longer portion of the insertion body, wherein the two opposing lugs are integral with the insertion body and are bent inwards to laterally engage around the bending element.

3. The steering column of claim 1 comprising two opposing lugs disposed at a lower end region of the shorter portion of the insertion body, wherein the two opposing lugs are integral with the insertion body and are bent inwards to laterally engage around the bending element.

4. The steering column of claim 1 comprising lugs disposed at the longer portion of the insertion body that laterally enclose the portion of the longer limb of the bending wire that is configured to be deformed.

5. The steering column of claim 1 wherein the insertion body is comprised of sheet metal or a spring steel sheet.

6. The steering column of claim 5 wherein the insertion body is formed in one piece by at least one of a punching process or a bending process.

7. The steering column of claim 1 wherein the insertion body is comprised of plastic or laminated fabric.

8. The steering column of claim 1 wherein at least a portion of the insertion body has a coating.

9. A steering column comprising:
a steering column tube that in normal operation is retained non-displaceably to a vehicle chassis, wherein the steering column tube is displaceable in a crash event;
a bending element that is connected to the vehicle chassis and to the steering column tube, wherein the bending element is deformed in a crash event as a result of the displacement of the steering column tube and thereby absorbs at least part of a kinetic energy of the steering column tube; and
an insertion body that surrounds the bending element at least partially and prevents the bending element from directly contacting adjacent structural elements, wherein in a crash event the insertion body deforms together with the bending element, wherein the bending element is a bending wire that is bent in a U-shape and comprises
a shorter limb that is oriented substantially parallel to the steering column tube;
a bent end or an end with an eye; and
a longer limb that is oriented substantially parallel to the steering column tube, wherein in a crash event the shorter limb is lengthened and the longer limb is shortened by deformation of the bending wire, wherein the insertion body comprises:
a shorter portion that covers part of the shorter limb;
a central portion bent in a U-shape; and
a longer portion that engages from an outside around a portion of the longer limb that is configured to be deformed; and comprising lugs disposed on the central portion of the insertion body, wherein the lugs are disposed laterally opposite one another in pairs that are integral with the insertion body and are bent inwards to laterally engage around the bending element.

10. The steering column of claim 9 comprising two opposing lugs disposed at an upper end region of the longer portion of the insertion body, wherein the two opposing lugs are integral with the insertion body and are bent inwards to laterally engage around the bending element.

11. The steering column of claim 9 comprising two opposing lugs disposed at a lower end region of the shorter portion of the insertion body, wherein the two opposing lugs are integral with the insertion body and are bent inwards to laterally engage around the bending element.

12. The steering column of claim 9 comprising lugs disposed at the longer portion of the insertion body that laterally enclose the portion of the longer limb of the bending wire that is configured to be deformed.

13. The steering column of claim 9 wherein the insertion body is comprised of sheet metal or a spring steel sheet.

14. The steering column of claim 13 wherein the insertion body is formed in one piece by at least one of a punching process or a bending process.

15. The steering column of claim 9 wherein the insertion body is comprised of plastic or laminated fabric.

16. The steering column of claim 9 wherein at least a portion of the insertion body has a coating.

17. A steering column for a motor vehicle, the steering column comprising:
a steering column tube in which a steering spindle is mounted rotatably about a longitudinal axis, the steering column tube being fastened to a carrier that is connected to a vehicle chassis such that in normal operation of the motor vehicle the steering column tube is retained non-displaceably on the carrier by at least one of friction forces or elastic forces, wherein the steering column tube is displaceable in a direction of the longitudinal axis in a crash event where a force that acts on the steering spindle in a direction of a front of the motor vehicle exceeds a threshold value;
an energy-absorption device that comprises a bending element that is connected to the carrier and to the steering column tube, wherein the energy-absorption device is deformed in a crash event as a result of the longitudinal displacement of the steering column tube and thereby absorbs at least part of a kinetic energy of the steering column tube; and
an insertion body that surrounds outer surfaces of the bending element and prevents the bending element from directly contacting adjacent structural elements, wherein in a crash event the insertion body deforms together with the bending element, wherein at least a portion of the insertion body has a coating.

18. A steering column comprising:

a steering column tube that in normal operation is retained non-displaceably to a vehicle chassis, wherein the steering column tube is displaceable in a crash event;

a bending element that is connected to the vehicle chassis and to the steering column tube, wherein the bending element is deformed in a crash event as a result of the displacement of the steering column tube and thereby absorbs at least part of a kinetic energy of the steering column tube; and an insertion body that surrounds the bending element at least partially and prevents the bending element from directly contacting adjacent structural elements, wherein in a crash event the insertion body deforms together with the bending element, wherein at least a portion of the insertion body has a coating.

\* \* \* \* \*